Feb. 16, 1954  A. G. FRAMPTON  2,669,161
UNIVERSAL SET-UP MEANS FOR PATTERN
CONTROLLED MACHINE TOOLS
Filed Nov. 3, 1951  2 Sheets-Sheet 1

INVENTOR
A.G.FRAMPTON
PER

ATTORNEY

Feb. 16, 1954

A. G. FRAMPTON 2,669,161

UNIVERSAL SET-UP MEANS FOR PATTERN
CONTROLLED MACHINE TOOLS

Filed Nov. 3, 1951

INVENTOR
A.G. FRAMPTON
PER

Gareth E. Maybee
ATTORNEY.

Patented Feb. 16, 1954

2,669,161

UNITED STATES PATENT OFFICE 2,669,161

UNIVERSAL SET-UP MEANS FOR PATTERN CONTROLLED MACHINE TOOLS

Arthur George Frampton, Toronto, Ontario, Canada, assignor to A. V. Roe Canada Limited, Malton, Ontario, Canada, a corporation Application November 3, 1951, Serial No. 254,749

4 Claims. (Cl. 90—13)

This invention relates to set-up means for pattern controlled machine tools.

In using a pattern controlled machine tool some form of work holder must be provided for securing a workpiece to the worktable and it is usually necessary to provide specific work holders for each particular job. Although this procedure is justified in production work where a large number of identical parts are being turned out, the necessary tooling becomes unduly expensive in cases where only a few parts are being manufactured. Accordingly, it is the object of this invention to provide a set-up means which can readily be used without modification for securing a large variety of workpieces to the machine.

The invention will be readily understood by reference to the accompanying drawings which form a part of this specification and in which.

Figure 1:
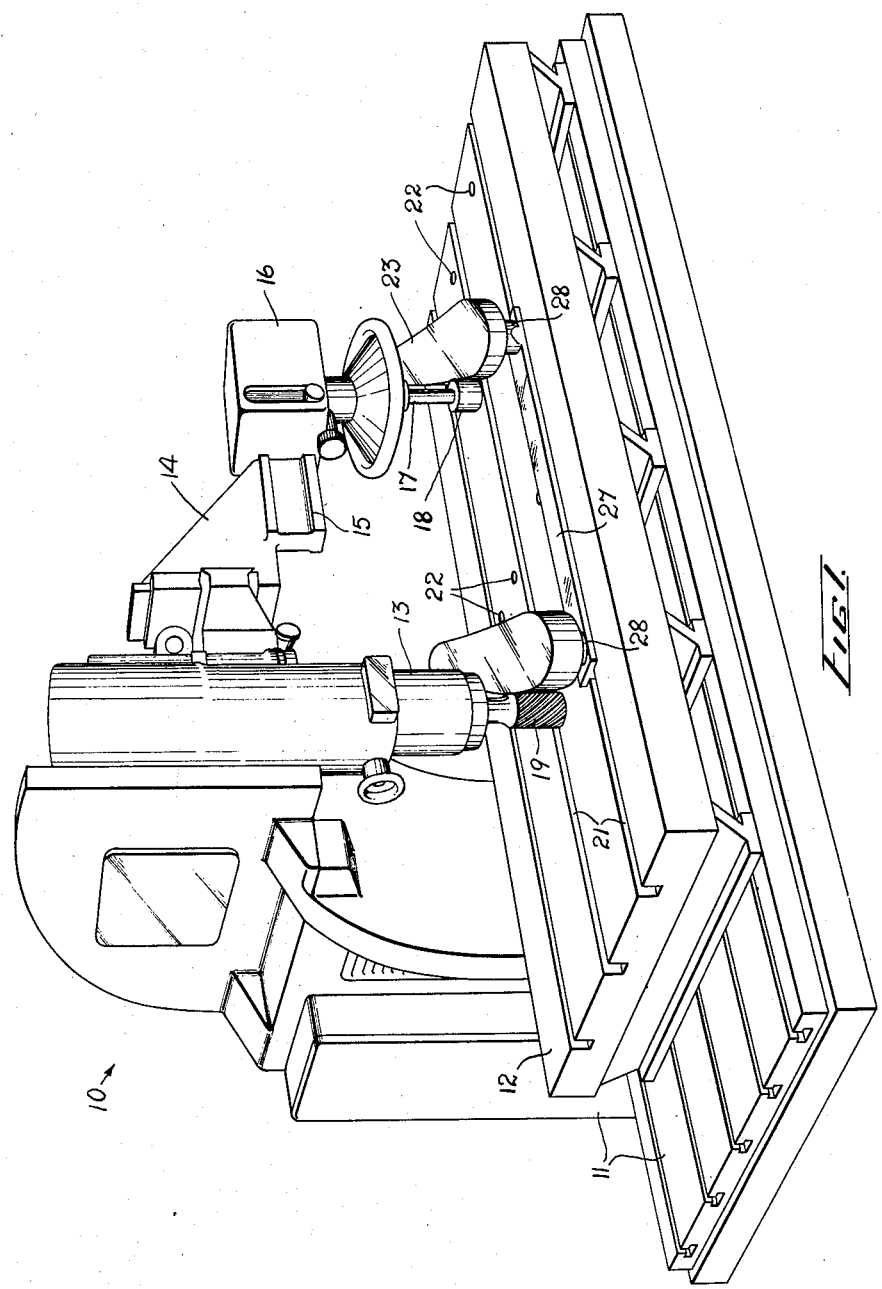
Figure 1 is a perspective view of a pattern controlled profile milling machine having set-up means constructed and arranged in accordance with the invention.

Referring to the drawings, Figure 1 shows a profile milling machine 10 having a frame 11 which supports a movable horizontal table 12 and a vertical spindle head 13. An arm 14 extends from the frame and terminates in a horizontal slideway 15, and a stylus box 16 is mounted on the slideway for movement towards or away from the spindle, provision being made to fix the stylus box rigidly in any desired position along the slideway. A stylus finger 17 is held vertically in a chuck mounted in the stylus box, and a follower 18 is fixed to the tip of the stylus finger for movement in a horizontal plane. A tool 19 is mounted vertically in a chuck in the spindle head 13.

Figure 2:
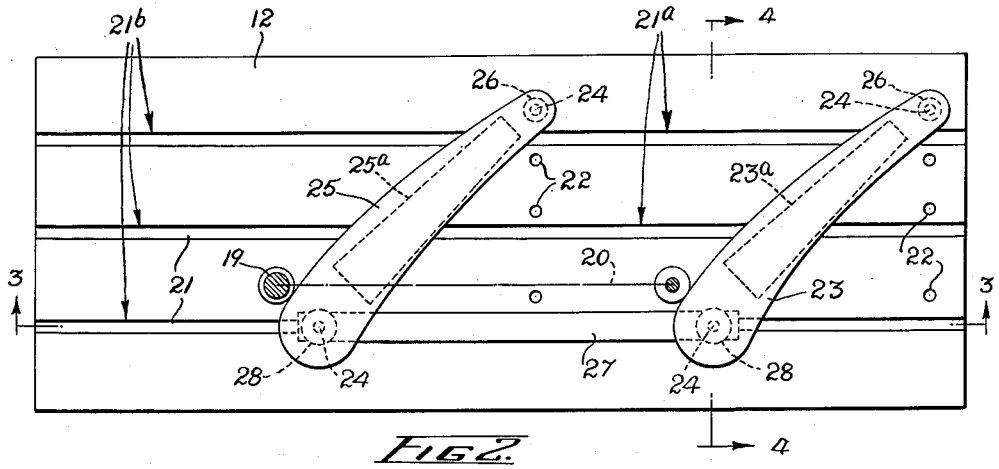
Figure 2 is a plan view of the worktable of the machine.
Figure 3:
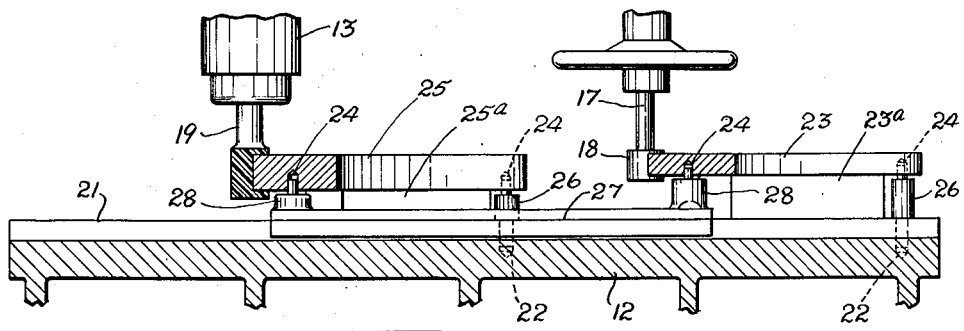
Figure 3 is a sectional view taken along the plane of the line 3—3 in Figure 2.
Figure 4:
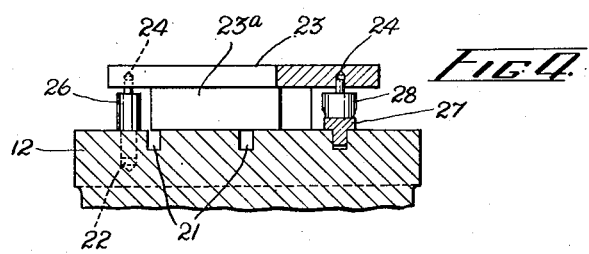
Figure 4 is a sectional view taken along the plane of the line 4—4 in Figure 2.

In the machine illustrated, displacement of the stylus finger regulates movement of the worktable 12 through an hydraulic system, and the stylus finger must be given an initial displacement from its "neutral position" before a profiling operation is begun; in practice, therefore, this neutral position of the stylus finger is difficult to determine because of the continual displacement of the stylus. When reference is made in the subsequent description to the "effective centre" of the stylus it means the true centre (or central axis) of the stylus when the stylus is in the neutral position. A straight datum line 20, joining the projection on the worktable of the effective centre of the stylus and the centre (or central axis) of the tool 19, is shown as a phantom line in Figure 2.

The worktable 12 is mounted in the conventional way for translatory motion in a horizontal plane in response to movement of the stylus finger 17. In the upper surface of the worktable there is a series of longitudinal grooves 21, these grooves being parallel to one another and to the datum line 20. In addition to the grooves there are two identical rows of locating holes 22 in the upper surface of the worktable, the rows being spaced apart longitudinally on the worktable and running perpendicularly to the grooves. The holes in one row are in the same relative position to each other and to the grooves as the holes in the other row, so that a line joining corresponding holes in the two rows would be parallel to the datum line 20.

A profiling operation is carried out by running the follower 18 around a pattern 23. The pattern may be made from sheet stock and is provided with a tooling hole 24 near each end. A workpiece 25 which is to be milled to conform to the profile of the pattern is provided with a pair of tooling holes 24 having an identical spacing to the holes in the pattern. Two locating pins 26 and a spacer bar 27 are provided to position the pattern 23 and the workpiece 25 on the worktable. The spacer bar is T-shaped in cross section, the vertical arm of the T being adapted to fit into any of the longitudinal grooves 21, and the bar has vertical locating pins 28 at each end. The distance between the centres of the locating pins 28 on the spacer bar 27 is equal to the distance between the centres of corresponding holes of the two parallel rows of locating holes 22.

To set the machine up for a profiling operation, the spacer bar 27 is mounted in one of the grooves 21 in the worktable, and the two locating pins 26 are inserted in correspondingly locating holes of the two parallel rows of locating holes 22. The pattern 23 and the workpiece 25, which rest on supporting blocks 23ª and 25ª respectively, are each positioned on the worktable 12 by fitting a tooling hole 24 at one end over one of the locating pins 26 and by sliding the spacer bar 27 in the groove until the tooling hole 24 at the other end fits over one of the spacer bar locating pins 28. Clamps (not shown) are provided to hold the pattern and the workpiece firmly against vertical movement. As illustrated, the tooling holes 24 are smaller than the locating holes 22, and the pins 26 are of stepped cylindrical shape to fit snugly into both.

The actual profiling operation is carried out by bringing the follower 18 into contact with the profile of the pattern 23 and then setting the machine in motion so that the follower runs around the pattern. Displacement of the stylus finger 17 as it moves to maintain contact with the pattern causes a corresponding displacement of the worktable 12 so that the tool 19 mills a profile on the workpiece 25 corresponding to the profile of the pattern.

The distance between the centres of the pins 26 is equal to the distance between the centres of the pins 28 and these distances are substantially equal to the length of the datum line 20. The said distances must of course be exactly equal to the length of the datum line 20 if the tooling holes 24 in the workpiece are to be located in the same position relative to the profile of the workpiece as the tooling holes 24 in the pattern are located relative to the profile of the pattern; this is of some importance if the finished workpieces are to be located on assembly by means of the tooling holes.

The position of the pattern and the workpiece relative to the worktable is important if good profiling is to be effected; this position is governed by the spacing of the tooling holes 24, and by the choice of the groove 21 and the locating holes 22 used for positioning. By providing several grooves and several sets of locating holes it is possible to obtain the proper position for various pattern shapes. In the embodiment illustrated, the centres of the locating pins 26 and 28 lie at the corners of a parallelogram.

It will be clear that the spacer bar 27 may be replaced by two short pin-carrying slides adapted to fit into the grooves. Further, instead of the grooves 21, other locating means may be used, such as ridges to which the workpiece and pattern can be clamped, and the locating holes 22 and pins 26 may be replaced for example, by pins formed integrally with the worktable. The pins 26 or their equivalents constitute locating points, and the grooves or their equivalents constitute locating lines having points at varying distances from the centres of the pins 26. The grooves may be regarded as constituting two sets of locating lines generally indicated as 21$^a$ and 21$^b$, one set 21$^a$ at the right-hand side of the worktable being associated with one row of holes 22 for positioning of the pattern, and the other set 21$^b$ at the left-hand side of the worktable being associated with the other row of holes 22 for positioning of the workpiece; in the embodiment illustrated, the locating lines of each set are aligned with the corresponding locating lines of the other set so that continuous longitudinal grooves 21 are formed, but it is obvious that the lines could, for example, run diagonally across the worktable and would still have points at varying distances from the pins 26.

In the embodiment illustrated the distances between the points 24 of the pattern and the points 24 of the workpiece are equal, although it will be noted that they need not necessarily be so. To achieve the desired orientation of the pattern relative to the workpiece it is merely necessary for the ratio of these distances to be equal to the ratio of the distance between a given point on one of the grooves of the set 21$a$ and the centre of the pin 26 for positioning the pattern, to the distance between a correspondingly positioned point on a groove of the set 21$b$ and the centre of the other pin 26. Thus, for instance, this ratio would be equal to the ratio of the perpendicular distances between the pins 26 and the corresponding grooves.

While reference has been made herein to the tooling holes 24, it is of course the recessed surfaces forming the bounds of the holes that act as the locating means of the pattern and workpiece.

In view of many modifications in structure which can be made, it is to be understood that the form of the invention herewith shown and described is to be taken as a preferred example of the same and that various changes may be made in the shape, size and arrangement of the parts without departing from the spirit of the invention or the scope of the subjoined claims.

What I claim as my invention is:

1. Means for positioning a pattern and a workpiece on a worktable of a pattern controlled machine having a tool and a follower, said means comprising a worktable having a first and a second locating pin, the pins being spaced apart longitudinally of the worktable; the worktable having a first groove extending along a line points of which are at varying distances from the first locating pin; the worktable having a second groove extending along a line points of which are at varying distances from the second locating pin; a third and a fourth locating pin slidably mounted in the first and the second groove respectively; a pair of spaced apart locating means on the underside of the pattern, the first locating pin being engageable with one of the locating means of the pattern and the third locating pin being engageable with the other locating means of the pattern; a pair of spaced apart locating means on the underside of the workpiece, the second locating pin being engageable with one of the locating means of the workpiece and the fourth locating pin being engageable with the other locating means of the workpiece, the locating means on the pattern and workpiece comprising recessed surfaces of complementary configuration to the pins with which they are engageable.

2. Means for positioning a pattern and a workpiece on a worktable of a pattern controlled machine having a tool and a follower, said means comprising a worktable having two parallel rows of identically spaced locating holes, the first row being spaced longitudinally of the worktable from the second row and being so located that a straight line joining corresponding holes in each row is parallel to and of substantially the same length as a datum line joining the projections on the worktable of the effective centres of the follower and the tool; a first and a second locating pin fitting in corresponding holes of the first and second row respectively; a first set of straight grooves in the worktable; a second identical set of straight grooves in the worktable, the grooves of the second set being aligned with the grooves of the first set and the grooves being parallel to said datum line; a positioning member slidably mounted in corresponding aligned grooves of the first and second set and having a third locating pin projecting upwardly from the groove of the first set and a fourth locating pin projecting upwardly from the corresponding groove of the second set; locating means on the underside of the pattern comprising a pair of recessed surfaces one of which is of complementary configuration to and registrable with the first locating pin and the other of which is of complementary configuration to and registrable with the third locating pin; and locating means on the underside of the workpiece comprising a pair of recessed surfaces one of which is of complementary configuration to and registrable with the second locating pin and the other of which is of complementary configuration to and registrable with the fourth locating pin.

3. Means for positioning a pattern and a workpiece so as to have a desired orientation relative to each other on a worktable of a pattern controlled machine having a tool and a follower, said means comprising a pair of locating means on the underside of the pattern at points spaced apart a predetermined distance; a pair of locating means on the underside of the workpiece at points spaced apart a predetermined distance, the locating means being so located on the workpiece that when the workpiece is oriented relative to the pattern so that a straight line joining the locating means on the workpiece is parallel to a straight line joining the locating means on the pattern the workpiece and the pattern are in the desired orientation relative to each other; a worktable having at its upper surface first and second locating means at points spaced apart longitudinally of the worktable; the worktable having at its upper surface third locating means coinciding with a plurality of points on the worktable at varying distances from the first locating means of the worktable; the worktable having at its upper surface fourth locating means coinciding with a plurality of points on the worktable at varying distances from the second locating means of the worktable, the points with which the fourth locating means coincides corresponding to points with which the third locating means coincides such that a first straight line joining a given point with which the third locating means coincides and the first locating means of the worktable is substantially parallel to a second straight line joining a corresponding point with which the fourth locating means coincides and the second locating means of the worktable, the ratio of the length of said first line to the length of said second line being equal to the ratio of the predetermined distance between the locating means of the pattern to the predetermined distance between the locating means of the workpiece; one of the locating means on the pattern being engageable with the first locating means of the worktable and the other locating means on the pattern being engageable with the third locating means at a given one of the points with which it coincides, one of the locating means on the workpiece being engageable with the second locating means of the worktable and the other locating means on the workpiece being engageable with the fourth locating means at a corresponding one of the points with which it coincides, the locating means of the pattern and workpiece being of complementary configuration to the means of the worktable with which they are engageable.

4. Means for positioning a pattern and a workpiece on a worktable of a pattern controlled machine having a tool and a follower, said means comprising a worktable having at its upper surface first and second locating means at points spaced apart longitudinally of the worktable, the first and second locating means being so located on the worktable that a straight line joining them is parallel to and of substantially the same length as a datum line joining the projections on the worktable of the effective centres of the follower and the tool; the worktable having at its upper surface third and fourth locating means disposed along straight lines on the worktable and aligned with each other and parallel to said datum line; a pair of locating means on the underside of the pattern at spaced apart points, one of the locating means on the pattern being engageable with the first locating means of the worktable and the other locating means on the pattern being engageable with the third locating means; and a pair of locating means on the underside of the workpiece at points spaced apart a distance equal to the distance between the locating means of the pattern, one of the locating means on the workpiece being engageable with the second locating means of the worktable and the other locating means on the workpiece being engageable with the fourth locating means, the locating means of the pattern and workpiece being of complementary configuration to the means of the worktable with which they are engageable.

ARTHUR GEORGE FRAMPTON.

References Cited in the file of this patent

UNITED STATES PATENTS

| Number | Name | Date |
|---|---|---|
| 900,976 | Bauer | Oct. 13, 1908 |
| 2,073,786 | Doutt | Mar. 16, 1937 |
| 2,399,187 | Jackson | Apr. 30, 1946 |
| 2,524,043 | Dougherty | Oct. 3, 1950 |
| 2,559,575 | Fryklund et al. | July 3, 1951 |